(12) United States Patent
Varadaraj et al.

(10) Patent No.: US 7,232,470 B2
(45) Date of Patent: Jun. 19, 2007

(54) COMPLEX OIL-IN-WATER-IN-OIL (O/W/O) EMULSION COMPOSITIONS FOR FUEL CELL REFORMER START-UP

(75) Inventors: Ramesh Varadaraj, Flemington, NJ (US); Paul J. Berlowitz, Glen Gardner, NJ (US)

(73) Assignee: ExxonMobil Research and Enigeering Company, Annandale, NJ (US)

( * ) Notice: Subject to any disclaimer, the term of this patent is extended or adjusted under 35 U.S.C. 154(b) by 270 days.

(21) Appl. No.: 10/675,169

(22) Filed: Sep. 30, 2003

(65) Prior Publication Data

US 2004/0121202 A1 Jun. 24, 2004
US 2007/0059567 A9 Mar. 15, 2007

Related U.S. Application Data

(63) Continuation-in-part of application No. 10/412,190, filed on Apr. 11, 2003, which is a continuation of application No. 09/791,996, filed on Feb. 23, 2001, now abandoned, which is a continuation of application No. 09/312,728, filed on May 14, 1999, now abandoned.

(60) Provisional application No. 60/435,044, filed on Dec. 20, 2002.

(51) Int. Cl.
 *C10L 1/32* (2006.01)

(52) U.S. Cl. ........................................................ 44/301
(58) Field of Classification Search .................... 44/301
 See application file for complete search history.

(56) References Cited

U.S. PATENT DOCUMENTS

| | | | | |
|---|---|---|---|---|
| 4,461,660 | A | * | 7/1984 | Binet et al. ..................... 149/2 |
| 5,444,078 | A | * | 8/1995 | Yu et al. ...................... 514/372 |
| 5,505,877 | A | * | 4/1996 | Krivohlavek ................. 516/40 |
| 2001/0038934 | A1 | * | 11/2001 | Berlowitz et al. ............ 429/19 |
| 2002/0177027 | A1 | * | 11/2002 | Yeager et al. ................. 429/34 |

FOREIGN PATENT DOCUMENTS

| | | |
|---|---|---|
| DE | 3229918 A1 | 2/1983 |
| WO | WO 98/1884 | 5/1998 |
| WO | WO 01/27165 A1 | 4/2001 |

* cited by examiner

*Primary Examiner*—Edward J. Cain
(74) *Attorney, Agent, or Firm*—Ramesh Varadaraj; Robert A. Migliorini

(57) ABSTRACT

The present invention is directed to oil-in-water-in-oil (O/W/O) emulsion compositions for starring a reformer or a fuel cell system. The oil-in-water-in-oil (O/W/O) emulsion compositions include hydrocarbon fuel, water, alkoxylated alkyl alcohol, alkoxylated alkyl ester and alkyl polyglycerol surfactants, and are used for starring a reformer of a fuel cell system.

15 Claims, 2 Drawing Sheets

FIGURE 1: CONVENTIONAL SYSTEM WITH NON-EMULSIFIED FUEL
Prior Art

COMPLEX OIL-IN-WATER-IN-OIL (O/W/O) EMULSION COMPOSITIONS FOR FUEL CELL REFORMER START-UP

CROSS-REFERENCE TO RELATED APPLICATIONS

This application claims the benefit of U.S. Provisional application 60/435,044 filed Dec. 20, 2002. This application is also a continuation-in-part of U.S. patent application Ser. No. 10/412,190 filed Apr. 11, 2003, which is a continuation of U.S. patent application Ser. No. 09/791,996 filed Feb. 23, 2001 now abandoned, which is a continuation of U.S. patent application Ser. No. 09/312,728 filed May 14, 1999 now abandoned.

The present invention relates to compositions for use at start-up a reformer of a fuel cell system. In particular, this invention includes emulsion compositions comprising hydrocarbon fuel, water and surfactant for use at start-up of a reformer of a fuel cell system.

Fuel cell systems employing a partial oxidation, steam reformer or autothermal reformer or combinations thereof to generate hydrogen from a hydrocarbon need to have water present at all times to serve as a reactant for reforming, water-gas shift, and fuel cell stack humidification. Since water is one product of a fuel cell stack, during normal warmed-up operation, water generated from the fuel cell stack may be recycled to the reformer. For start-up of the reformer it is preferable that liquid water be well mixed with the hydrocarbon fuel and fed to the reformer as an emulsion. The current invention provides complex oil-in-water-in-oil emulsion compositions suitable for use at start-up of a reformer of a fuel cell system.

SUMMARY OF THE INVENTION

One embodiment of the invention provides emulsion compositions suitable for use at start-up of a reformer of a fuel cell system comprising hydrocarbon, water and at least one surfactant from each of two types of surfactants. One type of surfactant (Type-A) is selected from the group consisting of alkoxylated alkyl alcohols, alkoxylated alkyl monoesters and alkoxylated alkyl diesters. The other type of surfactant (Type-B) is selected from the group consisting of alkyl polyglycerol monoesters and alkyl polyglycerol diesters.

In a preferred embodiment, the emulsion composition is a complex oil-in-water-in-oil emulsion.

In another embodiment of the invention is provided a method to prepare a complex oil-in-water-in-oil emulsion comprising mixing hydrocarbon, water and Type-A and Type-B surfactants at low shear.

DETAILED DESCRIPTION OF THE PREFERRED EMBODIMENTS

The emulsion compositions of the present invention can be used for start-up of a reformer of a fuel cell system. In a preferred embodiment the emulsion compositions can be used for start-up of a reformer of an improved fuel cell system described hereinafter. The improved fuel cell system comprises a convention fuel cell system to which a start-up system is operably connected. A conventional fuel cell system and the improved fuel cell system are described below.

Figure 1:
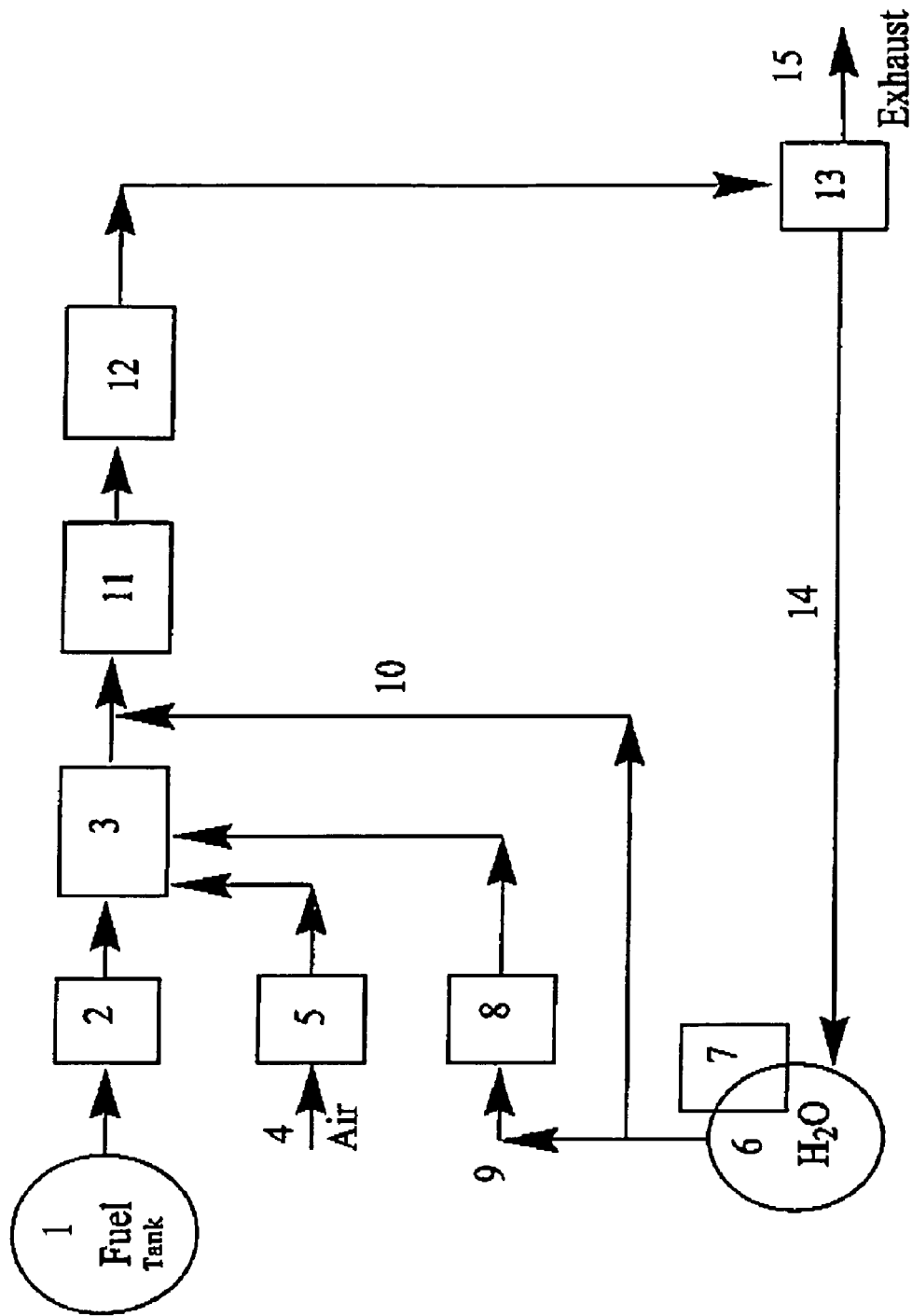
FIG. 1 shows a schematic diagram of a typical prior art conventional fuel cell system.

A conventional fuel cell system comprises a source of fuel, a source of water, a source of air, a reformer, a water gas shift reactor, reactors for converting CO to $CO_2$ and a fuel cell stack. A plurality of fuel cells operably connected to each other is referred to as a fuel cell stack. FIG. 1 shows a schematic of one embodiment of a prior art hydrogen generator bused on a hydrocarbon liquid fuel and using partial oxidation/steam reforming to convert the fuel into a syngas mixture. This system design is similar to that being developed by A. D. Little, except for the allowance of feeding water to the reformer to practice autothermal reforming (Ref.: I. Bentley, R M. Burnett and S. Hynke, 1992 Fuel Cell Seminar—Ext. Abs., 456, 1992). The process in FIG. 1 is comprised as follows: Fuel is stored in a fuel tank (1). Fuel is fed as needed through a preheater (2) prior to entering the reformer (3). Air (4) is fed to the reformer (3) after it is preheated by the air preheater (5). Water is stored in a reservoir tank (6). A heat exchanger (7) is integral with a portion of tank (6) and can be used to melt portions of the water if it should freeze at low operation temperatures. Some water from tank (6) is fed via stream (9) to preheater (8) prior to entering the reformer (3). The reformed syngas product is combined with additional water from tank (6) via scream (10). This humidified syngas mixture is then fed to reactors (11) which perform water gas shift (reaction of CO and water to produce $H_2$) and CO cleanup. The $H_2$ rich-fuel stream then enters the fuel cell (12) where it reacts electronically with air (not shown) to produce electricity, waste heat and an exhaust stream containing vaporized water. A hydrogen-oxygen fuel cell as used herein includes fuel cells in which the hydrogen-rich fuel is hydrogen or hydrogen containing gases and the oxygen may be obtained from air. This stream is passed through a condenser (13) to recover a portion of the water vapor, which is recycled to the water reservoir (6) via stream (14). The partially dried exhaust stream (15) is released to the atmosphere. Components 3 (reformer) and 11 (water gas shift reactor) comprise a generalized fuel processor.

Figure 2:
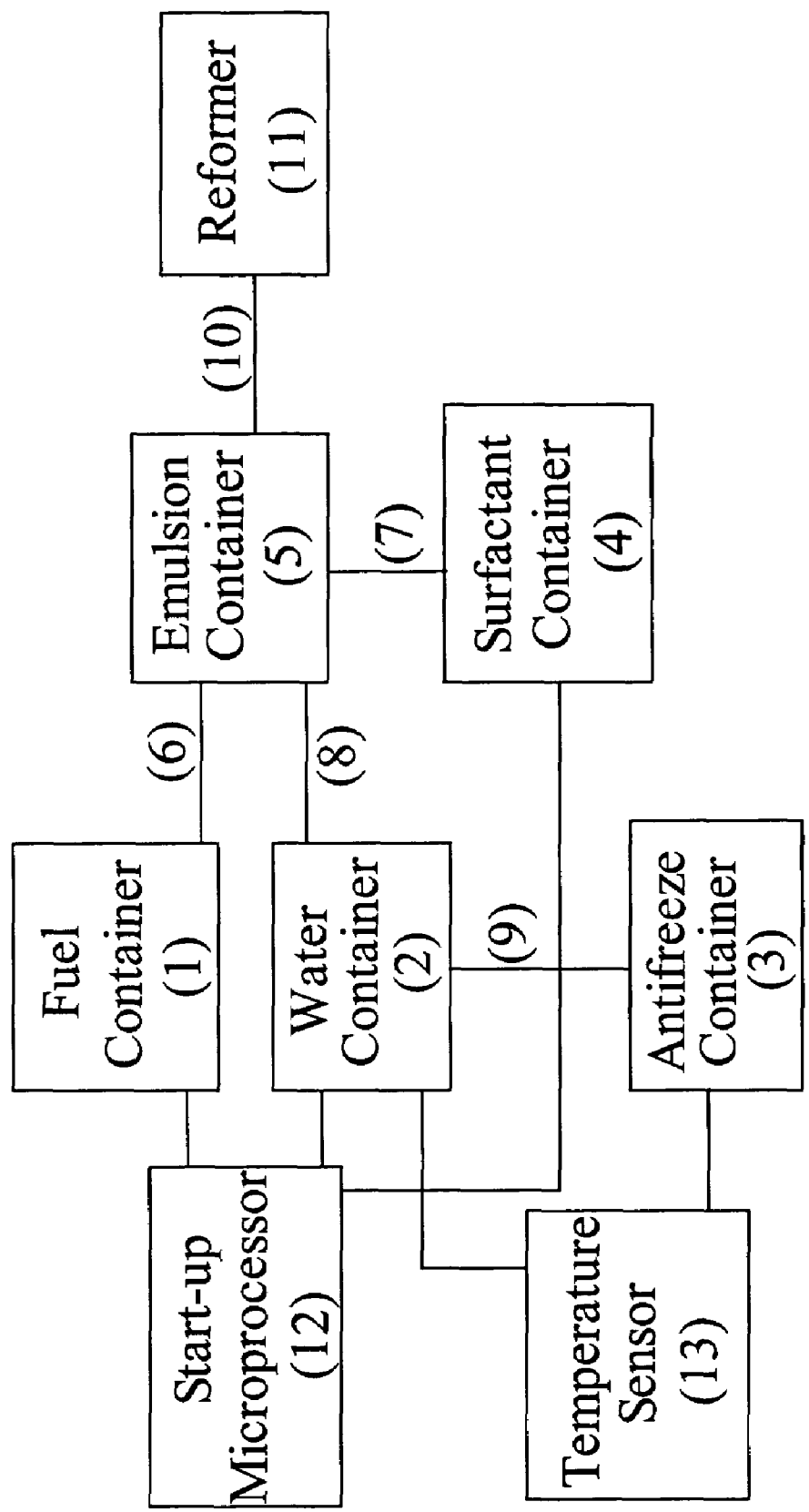
FIG. 2 shows a schematic diagram of an improved fuel cell system wherein a start-up system is operably connected to a reformer

FIG. 2 shows a schematic of one configuration for the fuel cell start-up system for connection to the conventional fuel cell system. The system in FIG. 2 is comprised as follows: fuel is stored in a fuel container (1), water in a water container (2), antifreeze in an antifreeze container (3), surfactant in a surfactant container (4), and emulsion is made in an emulsion container (5). The fuel and surfactant containers (1) and (4) are connected to the emulsion container (5) via separate transfer lines (6) and (7) respectively. The water container (2) is connected to the emulsion container (5) via a transfer line (8) to dispense water or water-alcohol mixture to the emulsion container. The water container is further connected to an antifreeze container (3) via a transfer line (9). The emulsion container is fitted with a mixer. An outlet line (10) from the emulsion container (5) is connected to the fuel cell reformer of a conventional system such as a reformer (3) shown in FIG.-1; (reformer (3) of FIG.-1 is equivalent to reformer (11) shown in FIG.-2). The fuel, water and surfactant containers are all individually connected to a start-up microprocessor (12) whose signal initiates the dispensing of the fuel, water and surfactant into the emulsion container. The water container is connected to a temperature sensor (13), which senses the temperature of the water in the water container. The temperature sensor is connected to a battery (not shown) and the antifreeze container. The temperature sensor triggers the heating of the water container or dispensing of the antifreeze as desired. The configuration for the fuel cell start-up described above is one non-limiting example of a start-up system. Other configurations can also be employed.

In an alternate embodiment of the start-up system the water container is the water storage chamber of the conventional fuel cell system. In another embodiment of the start-up system the emulsion container is eliminated. Fuel, water and surfactant are dispensed directly into the transfer line (10) shown in FIG.-2. In this embodiment the transfer line (10) is fitted with in-line mixers. A typical in-line mixer is comprised of a tubular container fitted with in-line mixing devices known in the art. One non-limiting example of an in-line mixing device is a series of fins attached perpendicular to the fluid flow. Another example is a series of restricted orifices through which fluid is propagated. In-line mixers are known to those skilled in the art of mixing fluids. The placement of the number and angle of the fins to the circumference of the tube is known to those skilled in the art of in-line mixer design. A sonicator can also be used as an in-line mixing device. The sonicator device for in-line mixing comprises a single sonicator horn or a plurality of sonicator horns placed along the transfer line (10).

A mixture comprising fuel and surfactant can be simultaneously injected with water into the front portion of the in-line mixer. Alternately, a mixture comprising water and surfactant can be simultaneously injected with fuel into the front portion of the in-line mixer. The fuel, water and surfactant are mixed as they flow through the in-line mixer to form an emulsion. The end portion of the in-line mixer delivers the emulsion to the reformer through an injection nozzle.

One function of the improved fuel cell system is that at start-up, the fuel and water are delivered as an emulsion to the reformer. One advantage to using an emulsion at start-up is that a well-mixed water/fuel injection is achieved. This can improve the efficiency of start-up of the reformer. Another advantage of using an emulsion is that the fuel-water mixture can be sprayed into the reformer as opposed to introducing vapors of the individual components into the reformer. Delivery of the fuel and water as an emulsion spray has reformer performance advantages over delivery of the fuel and water in a vaporized state. Further, spraying the emulsion has mechanical advantages over vaporizing the components and delivering the vapors to the reformer. Among the desirable features of emulsions suitable for use in the improved fuel cell start-up system described herein are: a) the ability to form emulsions are low shear; (b) the ability of the surfactants to decompose at temperatures below 700° C.; (c) the viscosity of the emulsions being such that they are easily pumpable, and, (d) the emulsion is stable at low temperature. The emulsions of the instant invention possess these and other desirable attributes.

The fluid dispensed from the emulsion container or the in-line mixer into the reformer is the emulsion composition of the instant invention suitable for start-up of a reformer of a fuel cell system. Once the reformer is started with the emulsion composition it can continue to be used for a time period until a switch is made to a hydrocarbon and steam composition. Typically a start-up time period can range from 0.5 minutes to 30 minutes depending upon the device the fuel cell system is the power source of. The emulsion composition of the instant invention comprises hydrocarbon, water and surfactant. In a preferred embodiment the emulsion further comprises low molecular weight alcohols. Another preferred embodiment of the emulsion composition is a complex oil-in-water-in-oil (O/W/O) emulsion.

An oil-in-water emulsion is one where oil droplets are dispersed in water. A water-in-oil emulsion is one where water droplets are dispersed in oil. An oil-in-water emulsion has water as the continuous phase. A water-in-oil emulsion has oil as the continuous phase. These are simple emulsions. In contrast, when water is dispersed in oil and the said dispersed water has further oil dispersed in it such an emulsion is a complex emulsion and called an oil-in-water-in-oil (O/W/O) emulsion. The types of surfactants required to form complex oil-in-water-in-oil emulsions are unique to the oil and water phases comprising the emulsion. A complex oil-in-water-in-oil emulsion has oil as the continuous phase.

In the instant invention the preferred oil is a hydrocarbon. The hydrocarbon component of the emulsion composition of the instant invention is any hydrocarbon boiling in the range of 30° F. (−1.1° C.) to 500° F. (260° C.), preferably 50° F. (10° C.) to 380° F. (193° C.) with a sulfur content less than about 120 ppm and more preferably with a sulfur content less than 20 ppm and most preferably with a no sulfur. Hydrocarbons suitable for the emulsion can be obtained from crude oil refining processes known to the skilled artisan. Low sulfur gasoline, naphtha, diesel fuel, jet fuel, kerosene are non-limiting examples of hydrocarbons that can be utilized to prepare the emulsion of the instant invention. A Fisher-Tropsch derived paraffin fuel boiling in the range between 30° F. (−1.1° C.) and 700° F. (371° C.) and, more preferably, a naphtha comprising C5–C10 hydrocarbons can also be used.

The water component of the emulsion composition of the instant invention comprises water that is substantially free of salts of halides sulfates and carbonates of Group I and Group II elements of the long form of The Periodic Table of Elements. Group I elements include H. Li, Na, K, Rb, Cs, and Fr. Group II elements include Be, Mg, Ca, Sr, Ba, and Ra. Distilled and deionized water is suitable. Water generated from the operation of the fuel coil system is preferred. Water-alcohol mixtures can also be used. Low molecular weight alcohols selected from the group consisting of methanol, ethanol, normal and iso-propanol, normal, iso arid secondary-butanol, ethylene glycol, propylene glycol, binylene glycol and mixtures thereof are preferred. The ratio of water:alcohol can vary from about 99.1:0.1 to about 20:80, preferably 90:10 to 70:30.

An essential component of the emulsion composition of the instant invention is a surfactant mixture comprising at least one surfactant from each of two types of surfactants. One type of surfactant (Type-A) is selected from the group consisting of alkoxylated alkyl alcohols, alkoxylated alkyl monoesters and alkoxylated alkyl diesters. The other type of surfactant (Type-B) is selected from the group consisting of alkyl polyglycerol monoesters and alkyl polyglycerol diesters.

Type-A surfactants comprise alkoxylated alkyl alcohols, alkoxylated alkyl monoesters and alkoxylated alkyl diesters having respective general chemical structures 1a), 1b) and 1c) shown below:

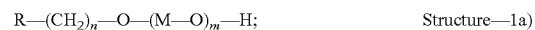

R—(CH$_2$)$_n$—O—(M—O)$_m$—H;  Structure—1a)

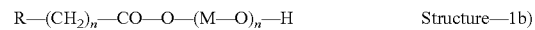

R—(CH$_2$)$_n$—CO—O—(M—O)$_n$—H  Structure—1b)

and

R—(CH$_2$)$_n$—CO—O—(M—O)$_m$—CO—(CH$_2$)$_n$—R  Structure—1c)

where R is a methyl group, n is an integer from about 5 to 17, m is an integer from about 2 to 50, M is $CH_2$—$CH_2$, $CH_2$—$CH_2$—$CH_2$, $CH_2$—$CH$—$CH_3$, $CH_2$—$CH_2$—$CH_2$—$CH_2$, $CH_2$—$CH$—$(CH_3)$—$CH_2$ or mixtures thereof.

Preferably in the Type-A surfactants, alkoxylated alkyl alcohols, alkoxylated alkyl monoesters and alkoxylated alkyl diesters the alkoxylated group is an ethoxylated group. That is, the preferred M is $CH_2$—$CH_2$ in structures 1a), 1b) and 1c).

Type-B surfactants comprise alkyl polyglycerol monoesters and alkyl polyglycerol diesters having respective general chemical structures 2a) and 2b) shown below:

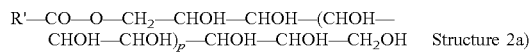

Structure 2a)

and

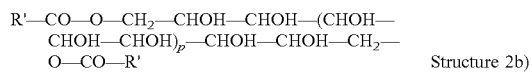

Structure 2b)

where R' is an alkyl group of 2 to 26 carbon atoms and p is an integer from about 0 to 15 and mixtures thereof.

The term "alkyl" in the alkoxylated alkyl alcohols, alkoxylated alkyl monoesters, alkoxylated alkyl diesters, alkyl polyglycerol monoesters and alkyl polyglycerol diesters is meant to represent saturated alkyl hydrocarbons, unsaturated alkyl hydrocarbons or mixtures thereof.

Preferably the Type-A and type-B surfactants decompose in the temperature range of 250° C. to 700° C. Preferably at about 700° C. substantially all of the surfactant is decomposed. The total concentration of Type A plus Type-B surfactants in the emulsion composition is in the range of 0.01 to 5-wt %. The preferred total concentration of Type A plus Type-B surfactants is in the range of 0.05 to 1 wt %. The ratio of Type-A to Type-B can be in the range of 1:1 to 1:4 i.e., equal amounts of Type-A and Type-B surfactants to four times more Type-B surfactant than Type-A surfactant. The preferred ratio of Type-A to Type-B surfactant is 1:1 to 1:2 and more preferred is 1:1 of Type-A to Type-B surfactants.

The ratio of hydrocarbon: water in the emulsion can vary from 40:60 to 60:40 based on the weight of the hydrocarbon and water. In terms of the ratio of water molecule: carbon atom in the emulsion, the ratio can be 0.25 to 3.0. A ratio of water molecule: carbon atom of 0.9 to 1.5 is preferred.

It is preferred to store the surfactant mixture comprising Type-A and Type-B surfactants as a concentrated surfactant solution in the start-up system of the fuel cell reformer. The concentrated surfactant solution can comprise the said surfactant mixture and hydrocarbon. Alternately, the concentrated surfactant solution can comprise the said surfactant mixtures and water. The amount of surfactant in the concentrated surfactant solution can vary in the range of about 80% surfactant to about 30-wt %, based on the weight of the hydrocarbon or water. Optionally, the concentrated surfactant solution can comprise the said surfactant mixture in a water-alcohol solvent. The amount of surfactants can vary in the range of about 80 wt % to about 30 wt %, based on the weight of the water-alcohol solvent. The ratio of water: alcohol in the water-alcohol solvent can vary from about 99:1 to about 1:99. The hydrocarbon, water and alcohol used for storage of the concentrated surfactant solution are preferably those that comprise the emulsion and described in the preceding paragraphs.

Oil-in-water-in-oil emulsions can be prepared by mixing oil, water and a mixture of Type-A and Type-B surfactants. Oil-in-water-in-oil emulsions generally referred to as O/W/O emulsions are more complex than and different from simple oil-in-water or water-in-oil emulsions hence, oil-in-water-in-oil emulsions are normally referred to as complex oil-in-water-in-oil emulsions. One preferred method to form the complex oil-in-water-in-oil emulsion is to first mix required amounts of oil and water with Type-B surfactant to from oil-in-water emulsion and excess oil. To the oil-in-water emulsion and excess oil is then added Type-A surfactant and the mixture mixed to from the complex oil-in-water-in-oil emulsion. A more preferred method is to add the concentrated surfactant solution comprising Type-A and Type-B surfactants dissolved in hydrocarbon, water or water-alcohol solvent to the mixture of oil and water and thereafter mixing at low shear. Low shear mixing can be mixing in the shear rate range of 1 to 50 $sec^{-1}$, or expressed in terms of mixing energy, in the mixing energy range of $0.15 \times 10^{-5}$ to $0.15 \times 10^{-3}$ kW/liter of fluid. Mixing energy can be calculated by one skilled in the art of mixing fluids. The power of the mixing source, the volume of fluid to be mixed and the time of mixing are some of the parameters used in the calculation of mixing energy. In-line mixers, low shear static mixers, low energy sonicators are some non-limiting examples for means to provide low shear mixing.

When Type-A and Type-B surfactants of the instant invention are added to a hydrocarbon, preferably naphtha and distilled water and subject to low shear mixing complex oil-in-water-in-oil emulsions are formed. Substitution of water with water/methanol mixture in the ratio of 80/20 to 60/40 does not alter the emulsifying performance of the surfactants or the nature of complex oil-in-water-in-oil emulsion that is formed.

In a preferred embodiment, the reformer of the fuel cell system is started with a complex oil-in-water-in-oil emulsion. In the operation of the fuel cell it is expected that the complex oil-in-water-in-oil emulsion composition will be utilized at start-up of the reformer and extending for a time period when a switch to hydrocarbon and steam is made. One embodiment of the invention is the feeding to the reformer of a fuel cell system, first a composition comprising the emulsion composition of the instant invention, followed by a hydrocarbon/steam composition. The complex oil-in-water-in-oil emulsion composition allows a smooth transition to the hydrocarbon/steam composition.

The following non-limiting examples and experiments illustrate the invention.

EXAMPLE-1

The effectiveness of the surfactants to form emulsions is expressed quantitatively by the reduction in interfacial tension between the hydrocarbon and water phases. In our experiments naphtha (a hydrocarbon mixture distilling in the boiling range of 50° F.–400° F.) was used as the hydrocarbon and double distilled deionized water as the aqueous phase. Table-1 provides interfacial tension data. Interfacial tensions were determined by the pendant drop method known in the art. Greater than 96% reduction in interfacial tension was observed indicative of spontaneous emulsification of the water and hydrocarbon phases by the Type-A and Type-B surfactants.

TABLE 1

| Solution | Interfacial tension (dynes/cm) |
|---|---|
| Naphtha/Water | 53.02 |
| Naphtha/Water + 1 wt % alkoxylated alkyl alcohol (structure 1a), n = 17; m = 2, M is $CH_2$—$CH_2$) added to naphtha | 1.51 |
| Naphtha/Water + 1 wt % alkoxylated alkyl esters (structure 1b), n = 10; m = 6, M is $CH_2$—$CH_2$) added to water | 0.86 |
| Naphtha/Water 1 wt % alkyl polyglycerol mono ester (structure 2a), R' = $C_{17}H_{35}$; p = 1) added to naphtha | 7.0 |

EXAMPLE-2

Thermogravimetry experiments on the representative Type-A and Type-B surfactants shown in Table-1 revealed decomposition or thermal degradation in the range of 250° C. to 700° C. At about 700° C. substantially all of the surfactant is decomposed.

EXAMPLE-3

Emulsions can be characterized by their droplet sizes as macro and micro type emulsions. A macro emulsion has dispersed droplets that are greater than 1 micron in diameter. A micro emulsion has droplet sizes that are less than 1 micron in diameter. The complex O/W/O emulsions disclosed herein are preferably macro emulsions of water-in-oil with 1 micron and less size oil droplets dispersed in the water. Thus, we describe the preferred oil-in-water in-oil emulsion as a micro-macro O/W/O emulsion. A more preferred O/W/O emulsion is a micro-micro O/W/O emulsion. By using dyes to color the hydrocarbon and water, optical microscopy enables determination of the type of emulsions by direct observation. An O/W/O emulsion will exhibit oil droplets dispersed in water and said oil-in-water droplets dispersed in oil. The sizes of the dispersed droplets of oil and water can be determined by microscopy using a calibration scale.

EXAMPLE-4

An oil-in-water emulsion has water as the continuous phase whereas; a water-in-oil has oil as the continuous phase. The preferred oil is a hydrocarbon. An O/W/O emulsion is oil continuous. Conductivity measurements are ideally suited to determine the phase continuity of the emulsion. A water continuous emulsion will have conductivity typical of the water phase. A hydrocarbon continuous emulsion will have negligible conductivity. An O/W/O emulsion with oil continuity will have conductivity corresponding to the oil or hydrocarbon.

EXAMPLE-5

0.5 g of alkyl polyglycerol Type-B surfactant (Structure 2a), R'=C17; p=1) (sold by Abietic Corporation as Caprol 3GO) was added 61 g isooctane (dyed orange) and 39 g water (dyed blue) and mixed using a Fisher Hemetology/ Chemistry Mixer Model 346. Mixing was conducted for 5 minutes at 25° C. The mixture was allowed to stand for 30 minutes. An oil-in water emulsion with excess oil splitting out was observed. To this mixture was added 0.6 g of polyethylene glycol 600 monolaurate (sold by Henkel Corporation as Emerest 2661 (structure 1b), n=10; m=6) and 0.4 g of polyethylene glycol 200 dilaurate (sold by Henkel Corporation as Emerest 2622 (structure 1c), n=10; m=2) and the mixture mixed again as described above. A milky white emulsion was observed with no phase separation even after 6 hours of standing. Using a Leitz optical microscope the emulsion was characterized as an O/W/O emulsion. Additionally it was characterized as a macro-macro O/W/O emulsion as described in Example-3. The conductivity of water was recorded as 47 micro mho, naphtha as 0.1 micro mho and the emulsion 8 micro mho confirming the oil continuity as described in Example-4.

EXAMPLE-6

The emulsion of example-5 was stable for at least 6 hours at 25° C. in the absence of shear or mixing. In comparison, in a control experiment wherein the stabilizing Type-A and Type-B surfactants were omitted and only the hydrocarbon and water were mixed, the resulting emulsion phase separated within 5 seconds upon ceasing of mixing. Yet another unexpected feature of the emulsions of the instant invention is that when the emulsions were frozen or cooled to −54° C. they solidified and when thawed or heated to +50° C. the emulsions liquefied and retained their stability and complex oil-in-water-in-oil nature. This freeze-thaw stability property is unique and in sharp contrast to simple O/W or W/O emulsions that phase separate upon freezing and thawing.

Using stable complex oil-in-water-in-oil emulsions comprised of hydrocarbon, water and mixtures of Type-A and Type-B surfactants of the instant invention has reformer performance advantages and enhancements compared to using unstable emulsions of hydrocarbon and water in the absence of stabilizing surfactants as disclosed in U.S. Pat. No. 5,827,496. The stability, complex oil-in-water-in-oil characteristic and the observed unique freeze-thaw stability property are at least three distinguishing features of the emulsion composition of the instant invention that can result in unexpected enhancement in reformer performance compared to conventional simple emulsions.

What is claimed is:

1. In a fuel cell system comprising a reformer to produce hydrogen containing gas for use in a fuel cell stack, the improvement comprising: feeding to the reformer, at startup, an emulsion composition comprising,
   at least 40 wt % of hydrocarbon,
   from 30 to 60 wt % of water, and
   from 0.01 to 5 wt % of a surfactant mixture comprising at least one surfactant from each of two types of surfactants, one type of surfactant comprising surfactants selected from the group consisting of alkoxylated alkyl alcohols, alkoxylated alkyl monoesters and alkoxylated alkyl diesters and the other type of surfactant comprising surfactants selected from the group consisting of alkyl polyglycerol monoesters and alkyl polyglycerol diesters, said alkoxylated alkyl alcohols represented by the formula,

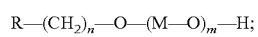
R—$(CH_2)_n$—O—(M—O)$_m$—H;

said alkoxylated alkyl monoesters represented by the formula,

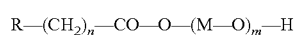
R—$(CH_2)_n$—CO—O—(M—O)$_m$—H said alkoxylated alkyl diesters represented by the formula,

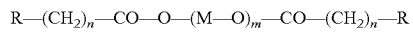

where R is a methyl group, n is an integer from about 5 to 17, m is an integer from about 2 to 50, M is $CH_2-CH_2$, $CH_2-CH_2-CH_2$, $CH_2-CH-CH_3$, $CH_2-CH_2-CH_2-CH_2$, $CH_2-CH-(CH_3)-CH_2$ or mixtures thereof, said alkyl polyglycerol monoesters represented by the general formula,

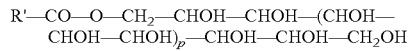

and, said alkyl polyglycerol diesters represented by the general formula,

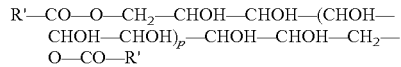

where R' is an alkyl group of 2 to 26 carbon atoms and p is an integer from about 0 to 15.

2. The improvement of claim 1 wherein the emulsion further comprises up to 20 wt % alcohol based on the total weight of the said emulsion wherein said alcohol is selected form the group consisting of methanol, ethanol, n-propanol. iso-propanol, n-butanol, sec-butyl alcohol, tertiary butyl alcohol, n-pentanol, ethylene gylcol, propylene glycol, butyleneglycol and mixtures thereof.

3. The improvement of claim 1 wherein said hydrocarbon is in the boiling range of –1° C. to 260° C.

4. The improvement of claim 1 wherein said water is substantially free of salts of halides, sulfates and carbonates of H, Li, Na. K, Rb, Cs, Fr, Be, Mg, Ca, Sr. Ba, and Ra.

5. The improvement of claim 1 wherein the emulsion is a complex oil-in-water-in-oil emulsion.

6. The improvement of claim 1 wherein said alkoxylated alkyl alcohols, alkoxylated alkyl monoesters, alkoxylated alkyl diesters, alkyl polyglycerol monoesters and alkyl polyglycerol diesters thermally decompose at temperatures in the range of about 250° C. to about 700° C.

7. The improvement of claim 1 wherein in said alkoxylated alkyl alcohols, alkoxylated alkyl monoesters, alkoxylated alkyl diesters the alkoxylated group is an ethoxylated group.

8. A method to prepare a complex oil-in-water-in-oil emulsion comprising mixing at mixing energy in the range of $0.15 \times 10^{-5}$ to $0.15 \times 10^{-3}$ kW/liter of fluid,
at least 40 wt % of hydrocarbon,
from 30 to 60 wt % of water, and
from 0.01 to 5 wt % of a surfactant mixture comprising at least one surfactant from each of two types of surfactants, one type of surfactant comprising surfactants selected from the group consisting of alkoxylated alkyl alcohols, alkoxylated alkyl monoesters and alkoxylated alkyl diesters and the other type of surfactant comprising surfactants selected from the group consisting of alkyl polyglycerol monoesters and alkyl polyglycerol diesters, said alkoxylated alkyl alcohols represented by the formula,

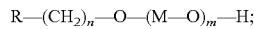

said alkoxylated alkyl monoesters represented by the formula,

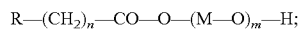

said alkoxylated alkyl diesters represented by the formula,

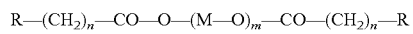

where R is a methyl group, n is an integer from about 5 to 17, m is an integer from about 2 to 50, M is $CH_2-CH_2$, $CH_2-CH_2-CH_2$, $CH_2-CH-CH_3$, $CH_2-CH_2-CH_2-CH_2$, $CH_2-CH-(CH_3)-CH_2$ or mixtures thereof, said alkyl polyglycerol monoesters represented by the general formula,

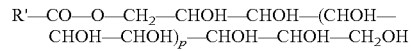

and, said alkyl polyglycerol diesters represented by the general formula,

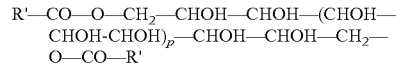

where R' is an alkyl group of 2 to 26 carbon atoms and p is an integer from about 0 to 15.

9. The method of claim 8 wherein mixing is conducted by an in-line mixer, static paddle mixer, sonicator or combinations thereof.

10. The method of claim 8 wherein said mixing is conducted For a time period in the range of 1 second to about 15 minutes.

11. A complex oil-in-water-in-oil emulsion comprising:
at least 40 wt % of hydrocarbon,
from 30 to 60 wt % of water, and
from 0.01 to 5 wt % of a surfactant mixture comprising at least one surfactant from each of two types of surfactants, one type of surfactant comprising surfactants selected from the group consisting of alkoxylated alkyl alcohols, alkoxylated alkyl monoesters and alkoxylated alkyl diesters and the other type of surfactant comprising surfactants selected from the group consisting of alkyl polyglycerol monoesters and alkyl polyglycerol diesters, said alkoxylated alkyl alcohols represented by the formula,

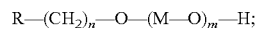

said alkoxylated alkyl monoesters represented by the formula,

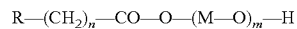

said alkoxylated alkyl diesters represented by the formula,

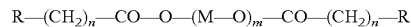

where R is a methyl group, n is an integer from about 5 to 17, m is an integer from about 2 to 50, M is $CH_2-CH_2$, $CH_2-CH_2-CH_2$, $CH_2-CH-CH_3$, $CH_2-CH_2-CH_2$, $CH_2-CH-(CH_3)-CH_2$ or mixtures thereof, said alkyl polyglycerol monoesters represented by the general formula,

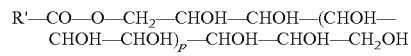

and, said alkyl polyglycerol diesters represented by the general formula,

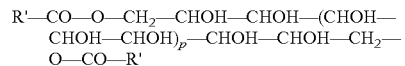

where R' is an alkyl group of 2 to 26 carbon atoms and p is an integer from about 0 to 15.

12. The complex oil-in-water-in-oil emulsion of claim 11 further comprising up to 20 wt % alcohol based on the total weight of the said emulsion wherein said alcohol is selected from the group consisting of methanol, ethanol, n-propanol, iso-proponal, n-butanol, sec-butyl alcohol, tertiary butyl alcohol, n-pentanol, ethylene gylcol, propylene glycol, butyleneglycol and mixtures thereof.

13. The composition of claim 11 wherein in said alkoxylated alkyl alcohols, alkoxylated alkyl monoesters arid alkoxylated alkyl diesters the alkoxylated group is an ethoxylated group.

14. The complex oil-in-water-in-oil emulsion of claim 11 wherein said emulsion has conductivity in the range of 3 to 15 mhos at 25° C.

15. The complex oil-in-water-in-oil emulsion of claim 11 wherein said emulsion is stable to freeze thaw cycles in the temperature range of −54° C. to +50° C.

* * * * *